(12) United States Patent
Allen

(10) Patent No.: US 9,077,394 B2
(45) Date of Patent: Jul. 7, 2015

(54) METHOD AND SYSTEM FOR GENERATING RF SIGNALS FROM COLLECTED RADIANCE ENERGY

(75) Inventor: Edward H. Allen, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 968 days.

(21) Appl. No.: 13/226,928

(22) Filed: Sep. 7, 2011

(65) Prior Publication Data

US 2013/0056652 A1    Mar. 7, 2013

(51) Int. Cl.
*H01Q 1/32* (2006.01)
*H04B 1/02* (2006.01)

(52) U.S. Cl.
CPC ........................................ *H04B 1/02* (2013.01)

(58) Field of Classification Search
USPC .......................................................... 343/713
See application file for complete search history.

*Primary Examiner* — Graham Smith
(74) *Attorney, Agent, or Firm* — McDermott Will & Emery LLP

(57) ABSTRACT

A system and method for collecting radiance energy from the Earth and using the collected radiance energy as the main energy source for generating RF signals is provided. The radiance energy collector may comprise an array of quantum systems configured to collect infrared energy radiated from the Earth. Once a sufficient amount of energy is collected (in the form of charged energy) by a cell of the array of quantum systems, a laser is configured to strike the cell with a certain amount of energy and phase and other attributes to allow the energy to be discharged and thus generate an RF signal. Most of the energy used for generating the RF signal is from the charged energy in the array of quantum systems and only a small portion of the total RF energy is contributed by the laser. The array of quantum systems and the laser generating module may be placed on an airship at a very high altitude.

22 Claims, 12 Drawing Sheets

METHOD AND SYSTEM FOR GENERATING RF SIGNALS FROM COLLECTED RADIANCE ENERGY

STATEMENT REGARDING FEDERALLY SPONSORED RESEARCH OR DEVELOPMENT

Not applicable.

FIELD OF THE INVENTION

The present invention generally relates to a system and method for collecting radiance energy and producing RF emission therefrom. Specifically, some embodiments relate to a system/method that collects and converts radiance infrared energy from the Earth into energy for transmitting RF signals.

BACKGROUND

Today's society heavily depends on the communication network to run governmental services, operate businesses, and keep in touch with friends and family. Many essential government functions such as police and other emergency services heavily rely on the city's communication network to operate. A total failure of a city's communication network would cause widespread chaos and panic, and would effectively cause the city to shutdown. To prevent a total failure of communication network, many cities deploy and implement many forms of communication network such as cellular, satellite, internet, and the reliable plain old telephone system (POTS).

Even with multiple communication networks, it is desirable to have the ability to quickly set up a long term and continuous communication network on very short notices due to unforeseen disaster. One prime and recent example is the city of New Orleans' Katrina disaster. In this extreme case, the city's of New Orleans pars and cellular network were effectively destroyed, which greatly impeded rescue efforts due to the inability to communicate. Satellite communication may have been possible, but at great cost and only for limited duration.

Sometime it is also advantageous or even a necessity to have the ability to provide a reliable communication network anywhere in the world on short notices for rescue, scientific, and fire fighting efforts. For example, various regions of the world are sparsely populate and have little or no communication network. However, in an emergency situation such as a wildfire or a rescue mission, it would be advantageous to deploy a reliable communication network to the region in order to establish communication.

For security reasons, it may also be desirable to maintain radar surveillance of a region that is generally inaccessible to ground based radar or where ground base radar is inadequate. Accordingly, there is a need for a reliable on demand communication network or radar system that can be set up in short notices without the need to install ground infrastructures.

SUMMARY

The present disclosure provides a system and method for collecting radiance energy from the Earth and using the collected radiance energy as the main energy source for generating RF signals. The radiance energy collector may comprise an array of quantum systems configured to collect infrared energy radiated from the Earth. Unlike solar energy, the Earth's radiance energy, also known as "Earthshine", is available 24 hours per day. Once an sufficient amount of energy is collected (in the form of charged energy) by a cell of the array of quantum systems, a laser is configured to strike the cell with a certain amount of energy and phase to generate a RF signal. Most of the energy used for generating the RF signal is from the charged energy in the cell and only a small portion of the total RF energy is contributed by the laser. Additionally, the array of quantum systems and the laser generating module may be placed on an airship at a very high altitude. The high altitude enables the array of quantum systems to have a large radiance energy collection aperture.

The present disclosure provides a method for generating radio frequency (RF) signals from the Earth's radiance energy. The method comprises collecting and storing radiance energy using an array of quantum systems. The array of quantum systems comprises a layer of charge transport material sandwiched between first and second layers of conductive film. The method also comprises striking a photoconductive layer adjacent to the second layer of conductive film of the array of quantum systems using a laser to produce RF signals at a predetermined frequency.

According to another aspect of the present disclosure, a system for generating radio frequency (RF) signals is provided. The RF generation system comprises an array of quantum systems configured to collect and store radiance energy, from a radiated body. The array of quantum systems comprises a layer of charge transport material sandwiched between first and second layers of conductive film. The array of quantum systems may also comprise a photoconductive layer adjacent to the second layer of conductive film of the array of quantum systems. In an aspect of the present disclosure, the array of quantum systems may be located on an exterior surface of the airship. Additionally, the airship comprise a laser module configured to strike the photoconductive layer to cause the array of quantum systems to emit an RF signal.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
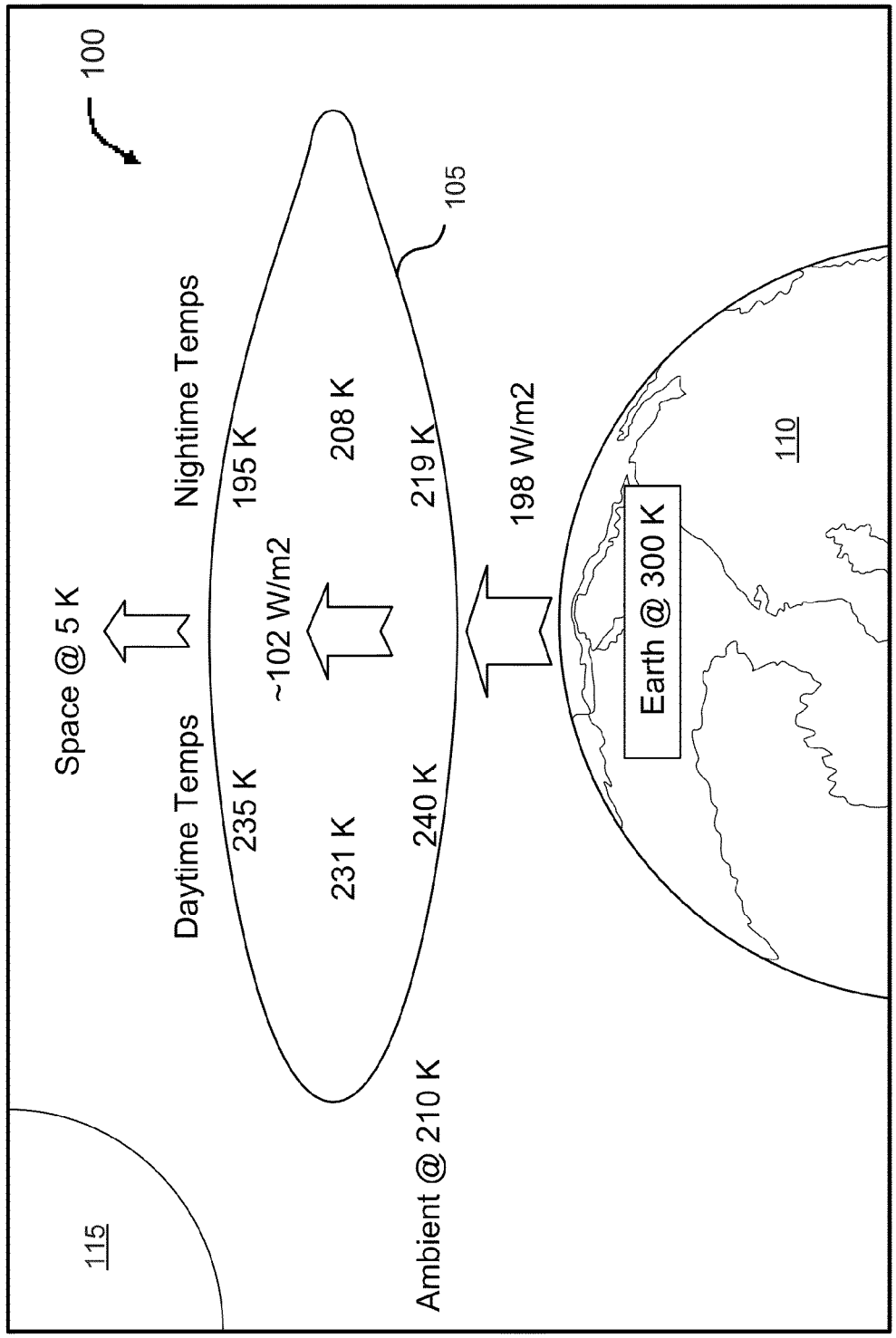
FIG. 1 illustrates an exemplary environment in which the radiance energy collection and RF generation method and system may be implemented according to one embodiment of the present invention.

Before describing the invention in detail, it is useful to describe an example environment in which the invention may be implemented. FIG. 1 illustrates an environment 100 in which the system and method for generating RF signals using energy mainly from radiance energy collected from the Earth according to one embodiment of the present invention. As shown in FIG. 1, environment 100 includes an airship 105, Earth 110 ("Earth"), and the Sun 115 ("Sun"). On a daily basis, the Earth absorbs an immense amount of energy from the Sun. Typically, the Earth absorbs about 70% of all of the solar radiation that reaches the Earth, the rest is reflected or scattered into space. On average the amount of solar radiation that falls on the Earth is 1.4 kW/m$^2$, so the Earth and its atmosphere absorbs approximately 980 W/m$^2$. In order to maintain an average temperature of roughly 279° Kelvin (higher in the regions of interest ~300° K), because it absorbs solar energy as a disk of area $\pi r^2$ and reradiates it as a sphere of surface area $4\pi r^2$, the Earth radiates heat, in the form of infrared (IR) energy, at around 245 Watts/m$^2$.

Rather than using solar radiation, airship 105 may be configured to absorb the Earth IR irradiance, which is approximately constant and is available 24 hours per day. Airship 105 may be fitted with an array of quantum systems (not shown), such as a plurality of quantum dot arrays, carbon nanotubes, nano-figured grapheme structures, or other structures known by those of ordinary skill in the art that are configured specifically to absorb energy at the infrared wavelengths. For example, the quantum dot arrays may be configured to behave like capacitors by storing the collected Earth IR irradiance as charged energy. This stored charged energy may then be converted into RF signals by inducing the quantum dot arrays to emit RF signals using a laser. The laser may be generated using a laser generation module (not shown) onboard of airship 105.

In one embodiment of the present disclosure airship 105 may be a blimp and may be kept afloat using lifting gas or a mixture of lifting gases that is lighter than air. In one embodiment of the present disclosure, airship 105 may use helium, hydrogen, or a mixture of both gases as the lifting gas. The lifting gas mixture may have a composition of 95% helium and 5% hydrogen.

Airship 105 may be configured to fly at very high altitude that is out of the path of commercial airliners such as 18 km to 25 km above the Earth surface. In one embodiment of the present disclosure, airship 105 may be flown at an altitude between 20 km to 22 km.

The altitude of airship 105 needs to be controlled. One of the main variables that causes altitude changes is the expansion and contraction of the lifting gas inside of airship 105. When exposed to temperature variations, the lifting gas will naturally expand and contract. As such, it is desirable to inhibit wide diurnal temperature swings caused by the absorption of solar radiation. In order to avoid temperature swings caused by solar radiation, airship 105 may be coated with a layer of frequency-selective reflectant coating tuned to solar wavelengths (not shown). Thus, by eliminating or minimizing the solar radiation absorbed by airship 105, the temperature inside of airship 105 may be better controlled.

As mentioned, the array of quantum systems may comprise a quantum dot array that may be induced to emit RF using a laser. The phase and frequency of the RF emitted by the quantum dot array may be controlled using various techniques that will be discussed in detail below. In one embodiment of the present disclosure, airship 105 may be configured to transmit (using the quantum dot array) RF signals that may carry telecommunication signals. Alternatively, airship 105 may be configured to transmit RF signals with radar detection characteristics.

Because airship 105 is mobile, it could be deployed anywhere in the world. Additionally, airship 105 may provide radar surveillance or telecommunication coverage to a wide region since it operates at a very high altitude.

Figure 2:
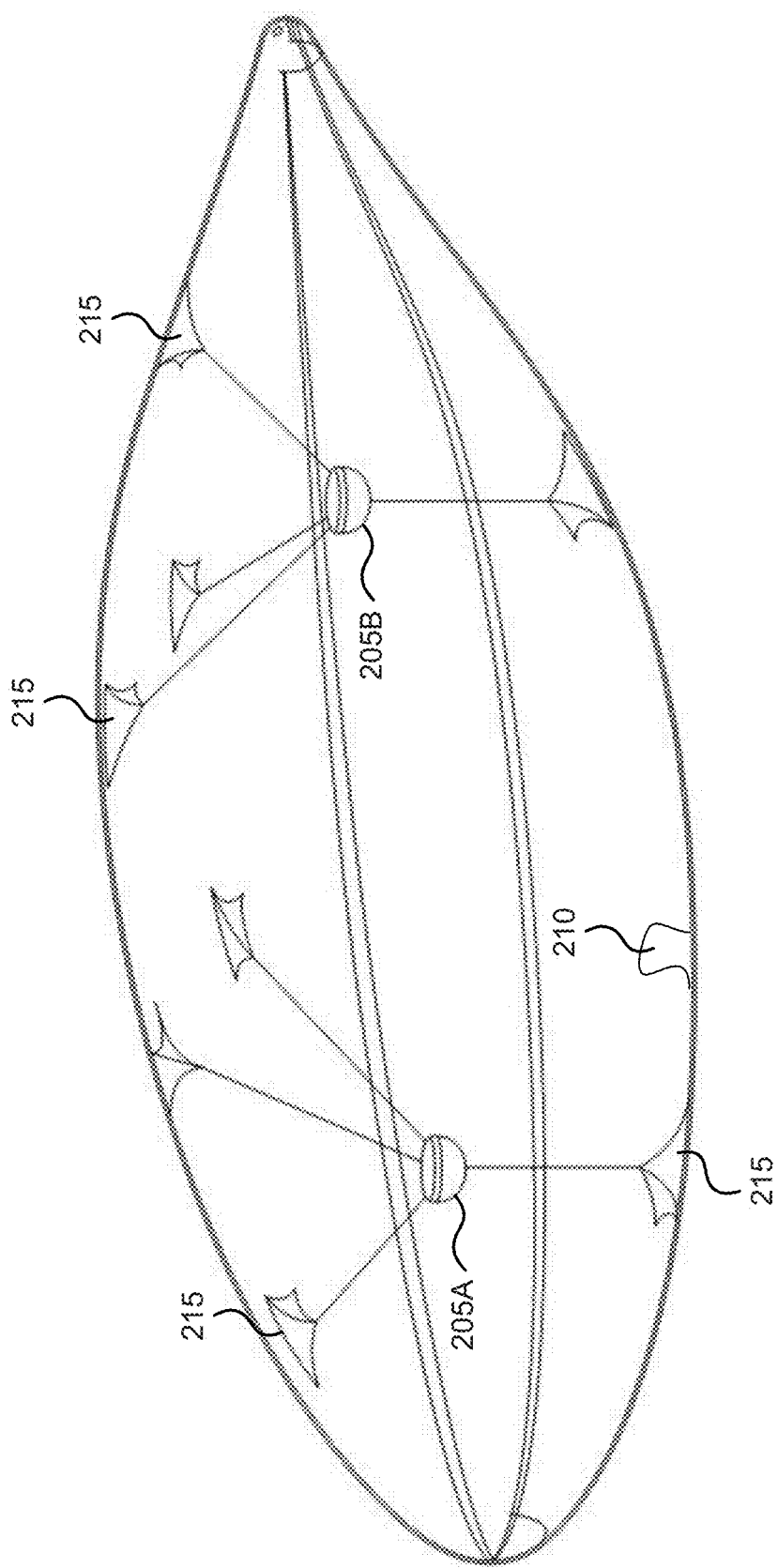
FIG. 2 illustrates an exemplary airship configured to carry the radiance energy collection and RF generation system according to one embodiment of the present invention.

FIG. 2 illustrates airship 105 configured to house the system for collecting radiance energy and generating RF signals using the collected radiance energy according to one embodiment of the present invention. As shown in FIG. 2, airship 105 includes a plurality of laser generation modules 205A-205B, also referred to as "chandeliers," and a portion of a quantum dot array 210. In one embodiment, quantum dot array 210 may cover the entire bottom half of airship 105. Alternatively, quantum dot array may cover more than 50% of the exterior surface of airship 105. Airship 105 may have one or more laser generation modules or chandeliers 205 mounted in the interior of airship 105. In one embodiment, airship 105 may have two chandeliers. Each of the chandeliers is anchored to airship 105 by a plurality of anchors 215. Each chandelier may be mounted near or on the horizontal axis (not shown) of airship 105. In this way, airship 105 may be balanced.

Figure 3A:
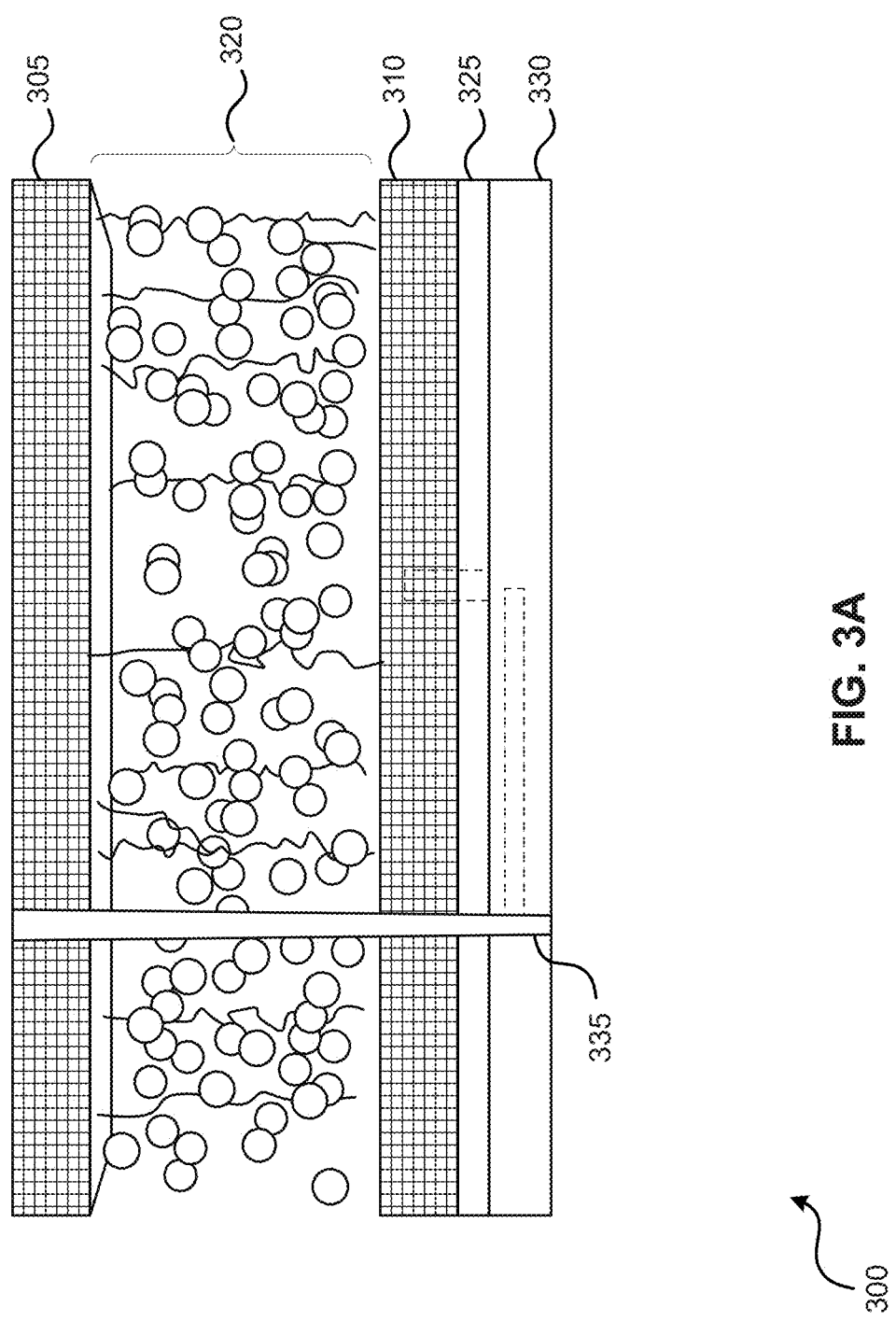
FIGS. 3A-3B illustrate an exemplary quantum dot cell according to one embodiment of the present invention.

FIG. 3A illustrates a cutout side view of an exemplary quantum dot array 300 according to one embodiment of the present invention. As shown in FIG. 3, quantum dot array 300 includes IR transparent conductive layers 305 and 310, a charge transport layer 320, a photoconductive layer 325, and a coating layer 330.

As the name implies, IR transparent conductive layers 305 and 310 are transparent to infrared wavelengths and are also conductive. Charge transport layer 320 separates conductive layers 305 and 310. The physical characteristics of each of conductive layers 305 and 310 will now be described. For brevity, only conductive layer 305 will be described below, and it should be understood that conductive layer 310 may have the same characteristic as conductive layer 305. Conductive layer 305 may have an approximate thickness of 0.4 micron (0.0004 mm) and may comprise of multi-walled carbon nanotube (MWCNT) fabric, which is spun out of carbon nanotube fibers, or alternatively, a sheet of functionalized graphene. In one embodiment, conductive layer is made from a nanotube fabric similar to the nanotube fabric developed by the Defense Advance Projects Agency (DARPA) and the University of Texas at Dallas (UTD), or from graphene material such as that manufactured by IBM.

Sandwiched between conductive layers 305 and 310 is charge transport layer 320. In one embodiment of the present invention, charge transport layer 320 comprises a plurality of nanocrystaline composite layers, which may have more than 200 layers of nartocrystals composite. Alternatively, charge transport layer 320 may comprise an olefin metathesis (OM) material wherein the conductivity of the OM material is changed by a carbon ring being opened (or closed) by a laser pulse acting as a synthetic Grubbs catalyst as is done in experiments using shaped laser pulses as adaptive reagents (see H. Rabitz, "SHAPED LASER PULSES ACTING AS ADAPTIVE REAGENTS" Princeton University Mar. 17, 2004 and "Teaching Lasers to Control Molecules," R. S. Judson and H. Rabitz, Phys. Rev, Lett., 68, 1500 (1992). Together, charge transport layer 320 and conductive layers 305 and 310 form a supercapacitor that has an energy storage density greater than conventional capacitors. Hereinafter, the term supercapacitor is referred to the capacitor created by charge transport layer 320 and conductive layers 305 and 310. Quantum dot array 300 comprises hundreds of thousand to hundreds of million of these supercapacitors. One or more of the supercapacitors may be linked or treated as a group of supercapacitors.

In one embodiment, each supercapacitor includes a diode for controlling the direction of current flow. The diode electrically couples conductive layer 305 to conductive layer 310 and to photoconductive layer 325. As shown in FIG. 3, photoconductive layer 325 is laminated onto conductive layer 310 on a side facing toward the Earth. In one embodiment, photoconductive layer 325 is positioned between transport layer 320 and conductive layer 310. Photoconductive layer 325 may be composed of a conductive polymer materials such as polyvinylcarbazole or any other materials that become electrically conductive when exposed to electromagnetic radiation.

Figure 3B:
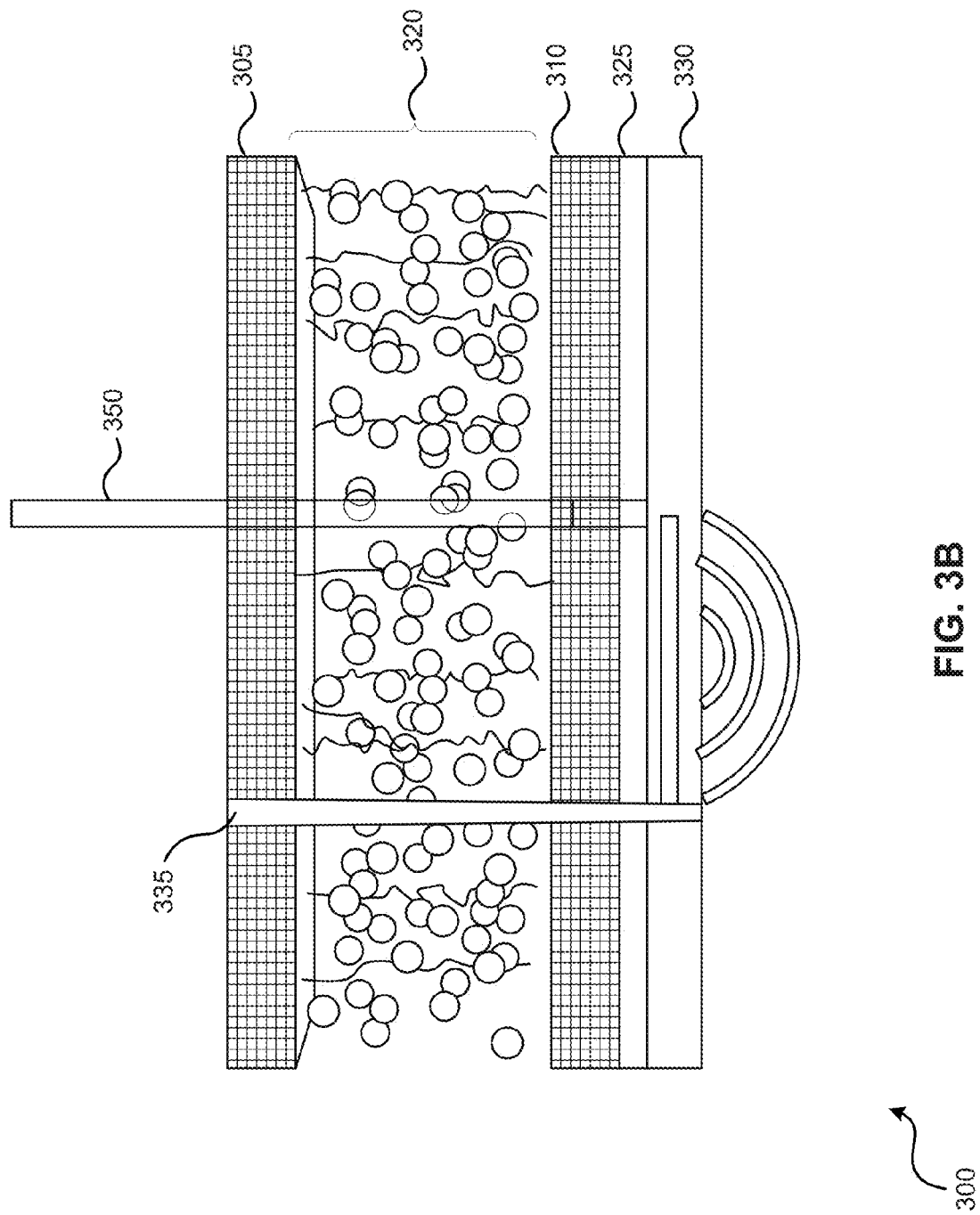

FIG. 3B illustrates the excitation of quantum dot array 300 using a laser according to one embodiment of the present invention. As shown in FIG. 3B, in operation, a laser 350 is fired onto photoconductive layer 325 when a supercapacitor or a unit of a quantum dot array is sufficiently charged. Once exposed to the laser, photoconductive layer 325 becomes electrically conductive and thereby completes the current path causing charged energy to move between conductive layers 305 and 310. Quantum dot array 300 may also be configured to emit RF signals at a certain frequency when current flows between conductive layers 305 and 310. The frequency of the emitted RF signals may be controlled by the phase, frequency, and other attributes of the laser (see H Rabitz, op.cit.).

In one embodiment, a protective layer 330 may be laminated to conductive layer 310 or to photoconductive layer 325, depending on the location of photoconductive layer 325. Protective layer 330 may be made of the same or similar materials, as conductive layers 305 and 310. Protective layer 330 may be made from an IR transparent material that emits RF signals when exposed to high electromagnetic radiation. Protective layer 330 may also be configured to emit RF signals when exposed to a current flow.

Figure 4:
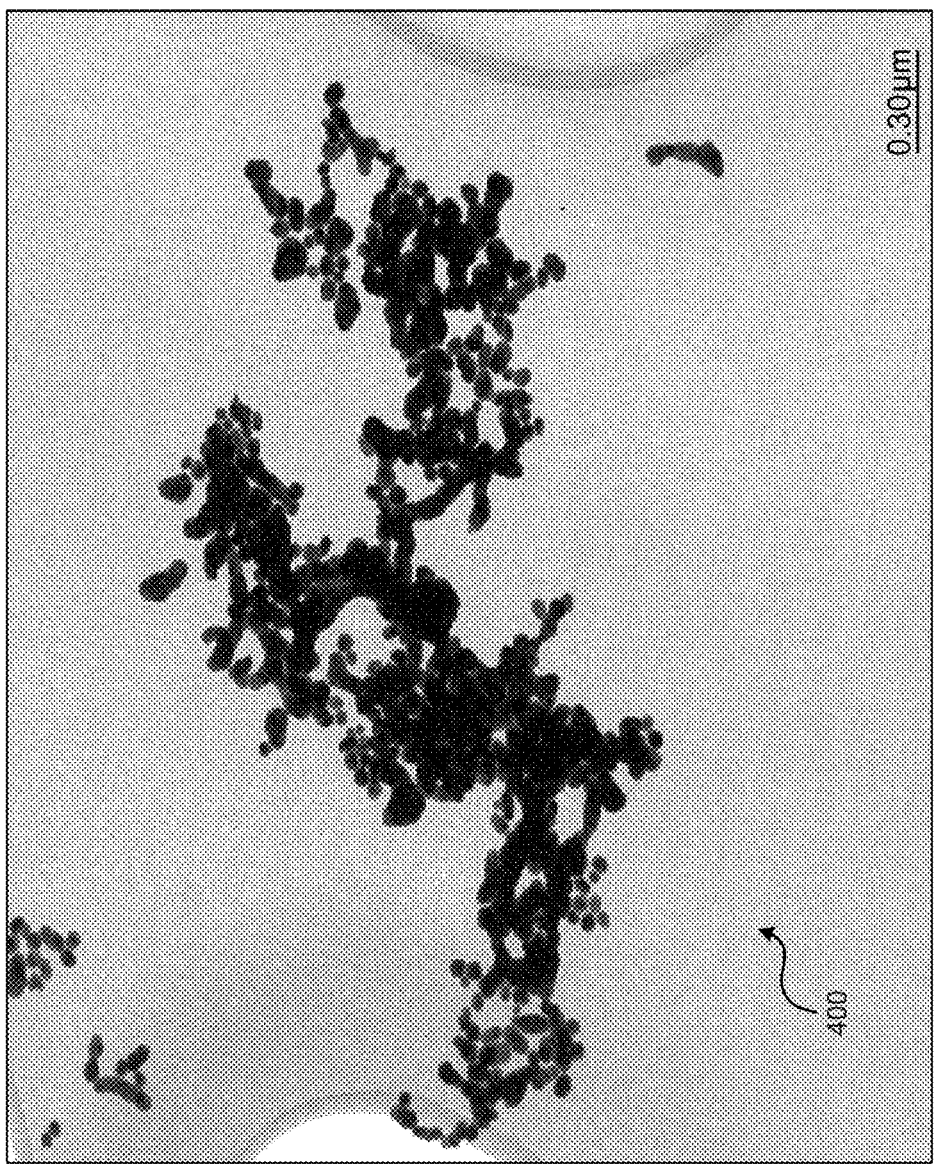
FIG. 4 illustrates an exemplary group of nartocrystals of a charge transport layer of a quantum dot cell according to one embodiment of the present invention.

FIG. 4 illustrates an enhanced (zoom) photomicrograph view of the nanocrystal distribution in a layer of nanocrystals composite according to one embodiment of the present invention. As shown in FIG. 4, nanocrystals 400 of charge transport layer 320 have a fractal like distribution pattern. The fractal distribution pattern of the nanocrystals enhances the conducive path of charged particles and enables the supercapacitor to have a high energy storage density (0.1+megajoules per kilogram). The mass of the fractal object or a fractal group of nanocrystals decreases as the distance from the center of mass of the fractal group increases. In one embodiment, the fractal mass to distance relationship is explained by the following equation: $pf \sim 1/r^{(3-df)}$, where the mass of the fractal object is (pf); distance from the center of the fractal object is (r) expressed in units of length, such as microns; and where (df) is a unit-less index of fractal dimension which describes the effective fractal dimension of a fractal object.

In one embodiment, nartocrystals 400 may be self-assembled. In other words, groups of nanocrystals 400 are made such that they coalesce to form a fractal mesh. Using nanocrystals 400 with fractal aggregation properties has many advantageous. Some of the advantages include absorption of long wavelength, which leads to better energy absorption characteristic, and limitation of dark current. Limiting dark current also helps reduce the noise of the system.

In one embodiment, nanocrystals 400 are composed made of Tin (Sn) or Tin alloy nanocrystals. It should be noted that nanocrystals of other metal alloy could also be used as long as it exhibits semiconducting properties and is tailored to the wavelength of the radiance intended to be harvested. The nanocrystals 400 may have an average dimension of 3 nanometer or less. It should be noted that FIG. 4 only shows a single group of nartocrystals coalescing into a fractal pattern. A single layer of nanocrystals may comprise hundreds of thousand to hundreds of million of individual groups of nanocrystals coalescing to form a fractal mesh. It should be noted that the fractal mesh merely stores and transports the energy and in order for the energy to be converted to RF, the energy must be accelerated across an antenna which may occur when the laser-induced conductivity shorts out the capacitor as previously described.

Figure 5:
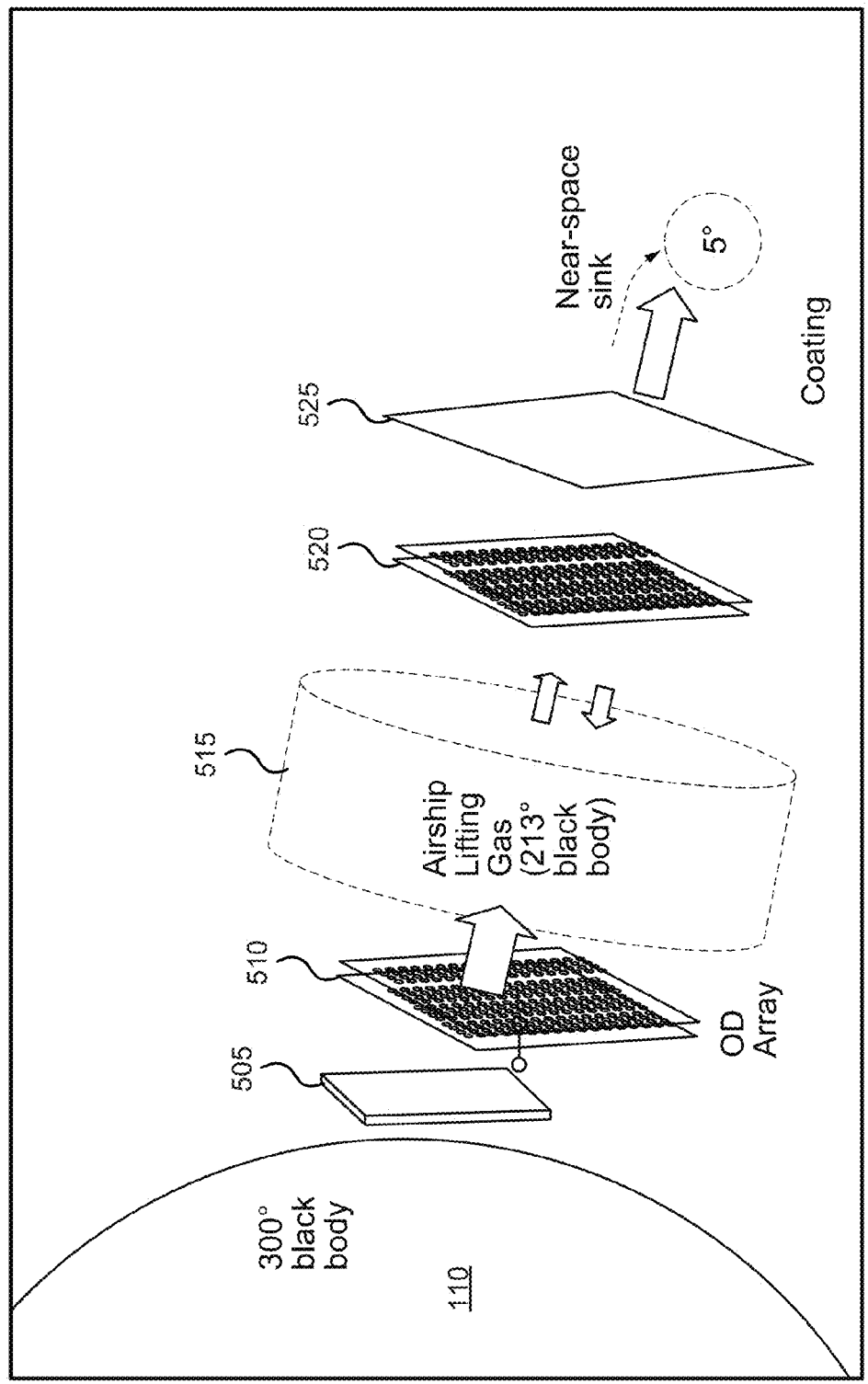
FIG. 5 illustrates an exemplary skin of the airship FIG. 2 having one or more quantum dot arrays according to one embodiment of the present invention.

FIG. 5 illustrates an exemplary skin composition of airship 105 according to one embodiment of the present invention. As shown in FIG. 5, the skin of airship 105 may comprise a protective layer 505, a quantum dot array layer 510, airship lifting gas 515, a second optional quantum dot layer 520, and a second protective layer 525. Protective layers 505 and 525 may be identical to protective layer 330. Quantum dot array layers 510 and 520 may comprise two or more of layers 305, 310, 320, and 325. In one embodiment, the airship only has one quantum dot array layer facing the Earth (i.e., quantum dot array layer 510). In other words, quantum dot array layer 520 is optional. Airship lifting gas 515 may be helium, hydrogen, a mixture of helium and hydrogen, or other lighter than air gas.

Referring again to FIG. 1 which illustrates an exemplary environment in which airship 105 may be operated. The operational altitude of airship 105 may be between 18 km to 25 km, depending on the environmental conditions of the location where airship 105 is operating. In one embodiment, airship 105 is operating at an altitude of 21.3 km. At this altitude, the ambient temperature is approximately 210° K and the Earth (viewed as a black body radiation) averages approximately 300° K. During the day, the average temperature experienced at the bottom and top of airship 105 is approximately 240° K and 235° K, respectively. At night, the average temperature experienced by at the bottom and top of airship 105 drop to 219° K and 195° K, respectively.

An exemplary amount of Earth irradiance energy seen by a portion of a quantum dot array at the bottom surface of airship 105 may be 198 NV/m$^2$. Since the skin of airship 105 is IR transparent, the irradiance energy experienced at the top surface of airship 105 may be approximately 100 W/m$^2$ after some of the irradiance energy has been collected by the quantum dot arrays at the bottom surface. To collect the irradiance energy at the top of airship 105, an optional quantum dot array layer may be implemented. However, the benefit of using of the top quantum dot array layer must be balanced in view of added weight, which most be supported by the lifting gas of airship 105.

Figure 6:
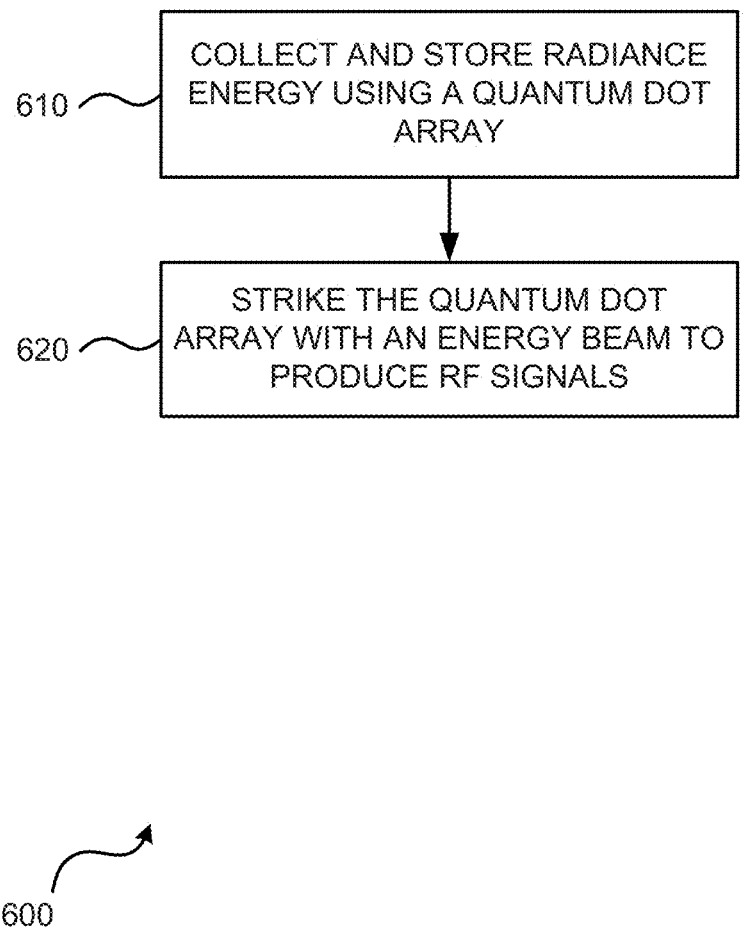
FIG. 6 illustrates an exemplary flow chart for generating RF signals from collected radiance energy according to one embodiment of the present invention.

FIG. 6 illustrates a flow diagram of a method 600 for generating RF signals using collected radiance energy according to one embodiment of the present invention. Method 600 starts at step 610 where radiance energy from a black body such as the Earth is collected and stored using a quantum dot array (e.g., array 300). In one embodiment, the radiance energy is stored as charged energy. Once a sufficient amount of energy is stored, at step 620, a energy beam generator is configured to strike the quantum dot array to induce the array to produce RF signals. The energy beam generator may be a laser generator. The amount of energy of the laser beam may be adjusted such that the main source of energy of the produced RF signals is from the stored radiance energy.

Figure 7:
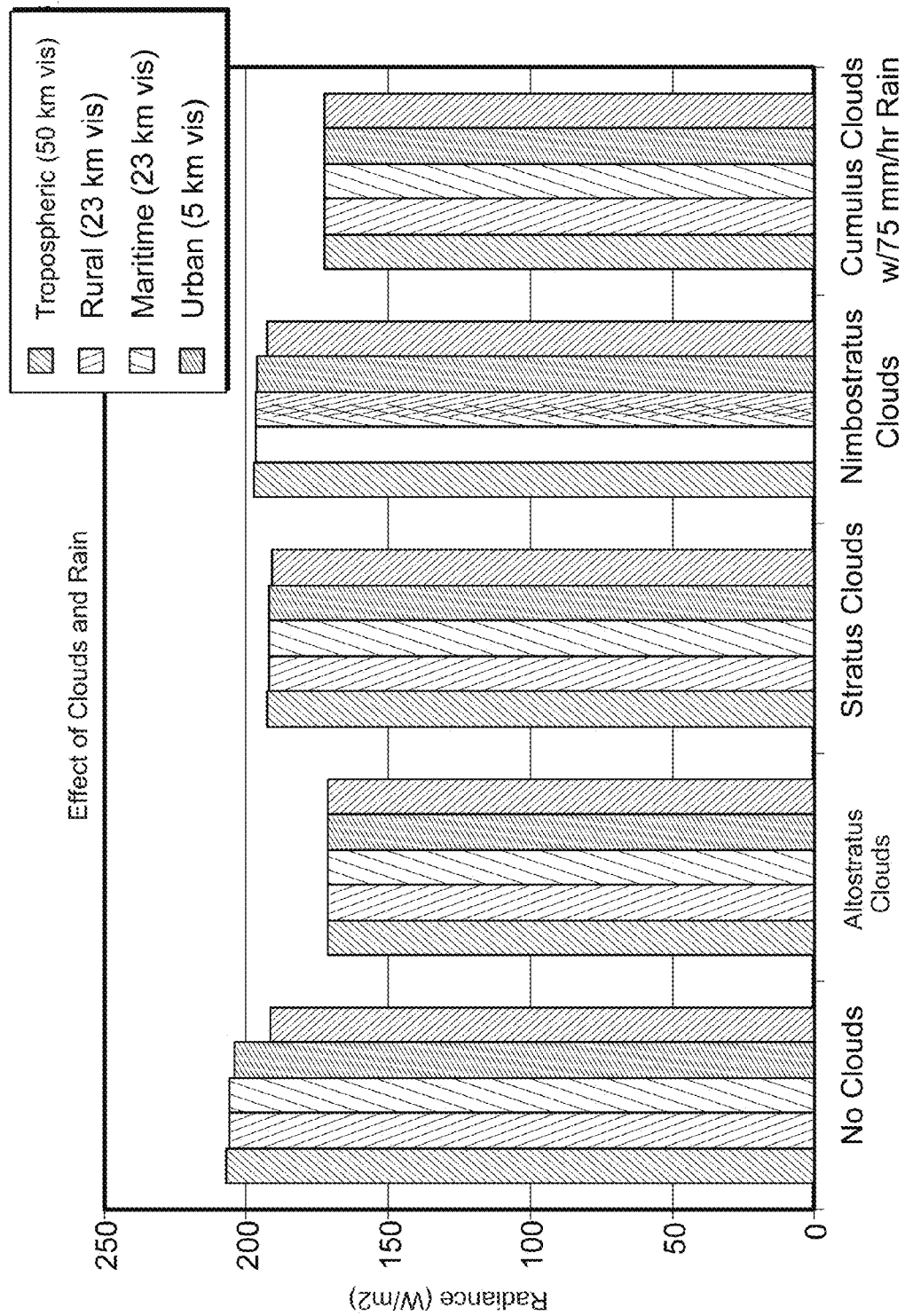
FIG. 7 illustrates an exemplary bar chart showing radiance energy density of the Earth in various weather conditions.

One of the advantages of using the earth's radiance energy over solar energy is its availability. Unlike solar energy, radiance energy is available 24 hours a day at a fairly constant rate. FIG. 7 illustrates the amount of radiance energy that may be collected by the quantum dot array of airship 105 according to one embodiment of the present invention. As shown in FIG. 7, the amount of radiance energy is nearly constant regardless of clear sky, cloud coverage, or rain which, of course, all occur well beneath the 18-25 km altitudes. The radiance energy also appears to be constant regardless of the locations of airship 105.

Figure 8:
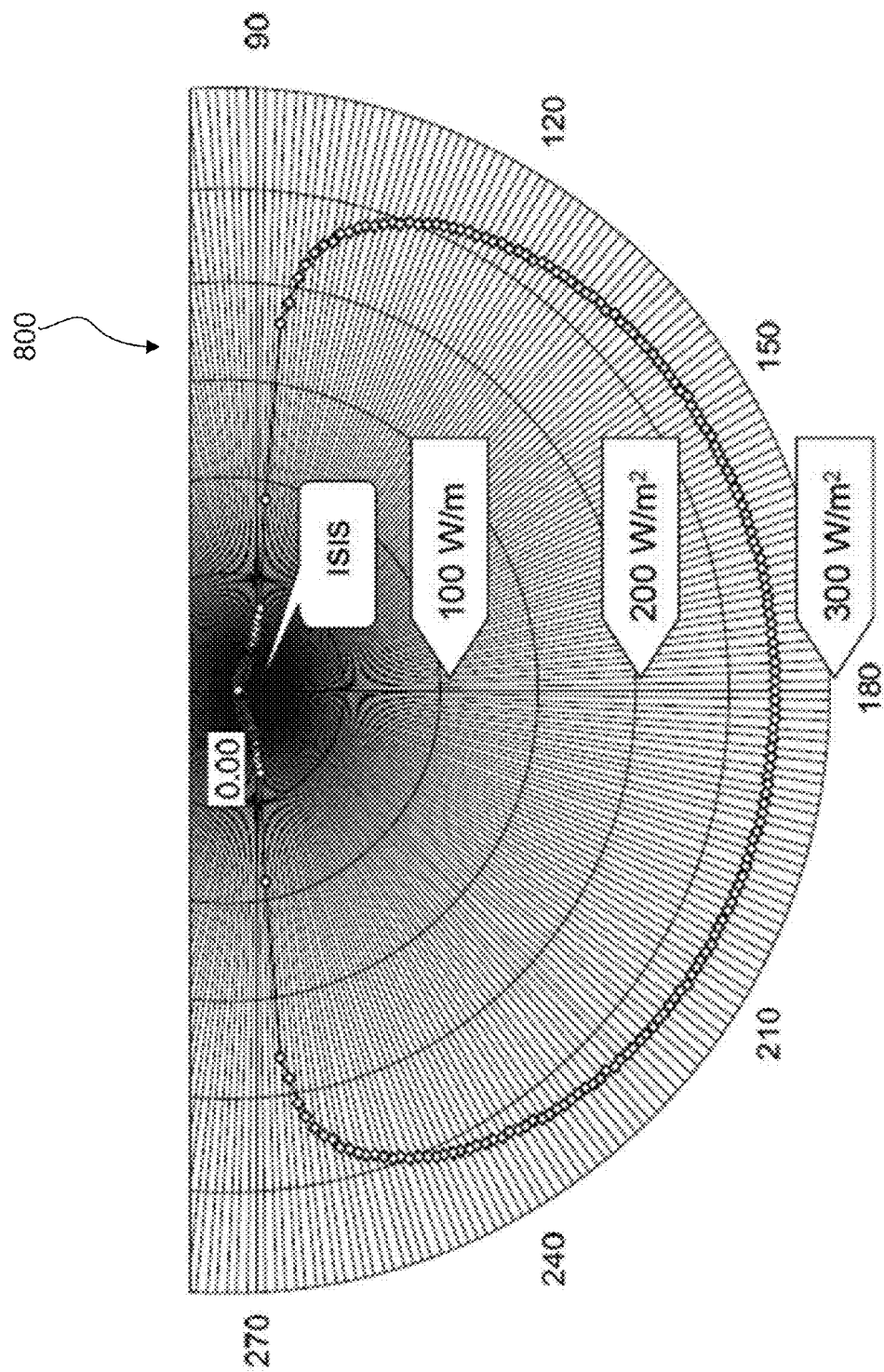
FIG. 8 illustrates an chart showing the radiance energy density experienced by the quantum dot array of the airship in FIG. 2 according to one embodiment of the present invention.

FIG. 8 illustrates an energy density diagram 800 experienced by quantum dot array 210 of airship 105. As shown in diagram 800, the average radiance energy experienced by quantum dot array 210 is approximately 270 W/m$^2$ at almost a 120 degrees window. From horizon-to-horizon, airship 105 may observe at least 200 W/m$^2$ of radiance energy. In one embodiment, at least 10% of the radiance energy observed by quantum dot array 210 is converted into RF energy.

Figure 9:
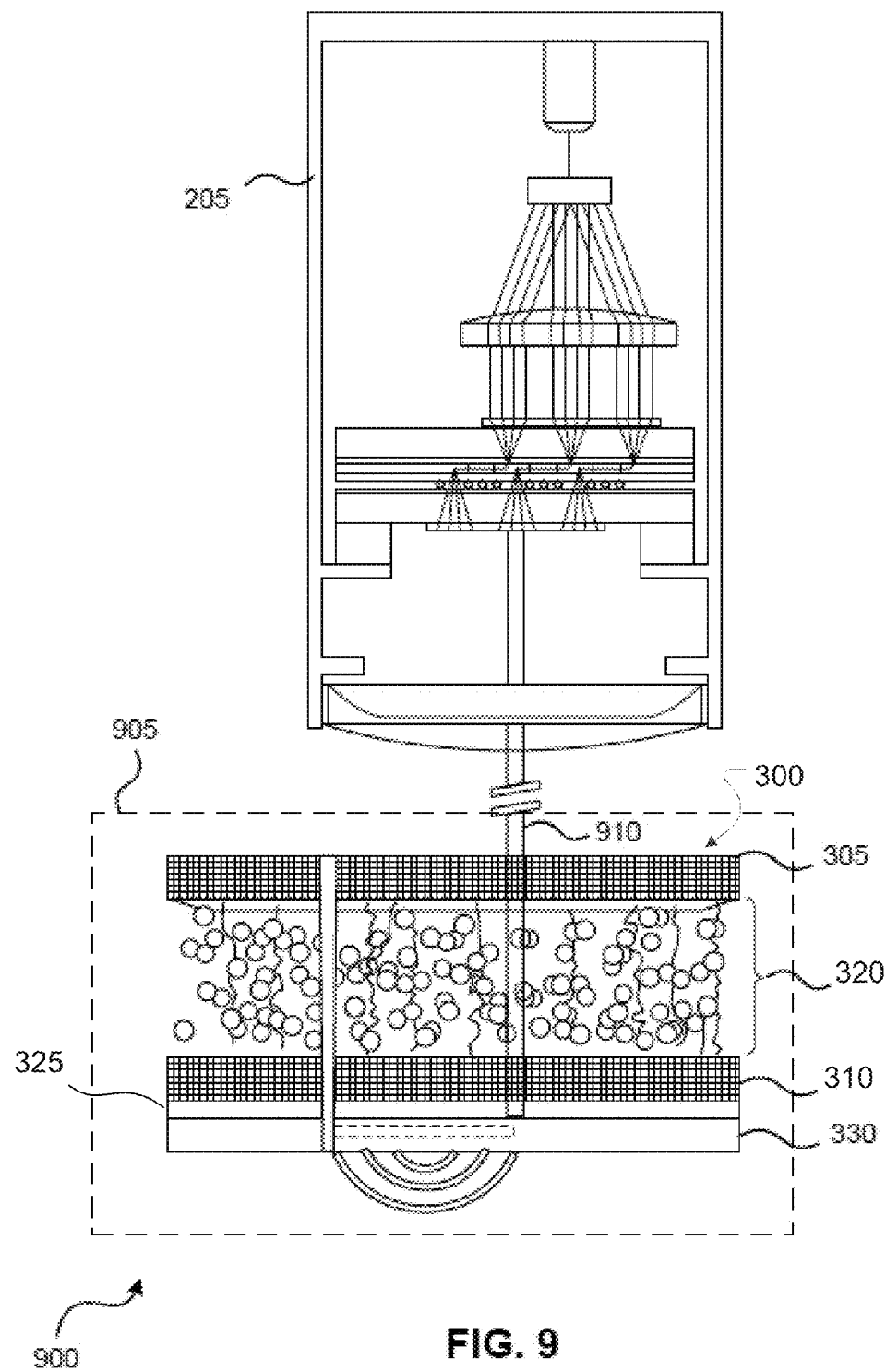
FIG. 9 illustrates an exemplary radiance energy collection and RF generation system according to one embodiment of the present invention.

FIG. 9 illustrates an exemplary radiance energy collection and RF generation system 900 according to one embodiment of the present invention. System 900 includes a plurality of quantum dot arrays 300 and a plurality of laser generation modules 205A. One of the plurality of laser generation modules 205A and a quantum dot cell 905 of the plurality of quantum dot arrays 300 are shown in FIG. 9. In one embodiment, quantum dot cell 905 may comprise conductive layers 305 and 310, charge transport layer 320, and photoconductive layer 325.

In operation, a laser source emits a laser beam to the plurality of laser generation modules by ways of a beam splitter. Each laser module is configured to strike a unit or a cell of the quantum dot array at a predetermined interval such that the interval of the strike determines the frequency of the RF generated. For example, an interval of one billionth of a second may generate 1 gigahertz carrier waves. In one embodiment, laser module 205A is configured to strike quantum dot cell 905 with a laser 910 whenever quantum dot cell 905 is charged with sufficient energy to emit a RF signal at a certain amplitude and frequency. The amplitude and frequency of the RF signal may also be adjusted by changing the phase, frequency, and/or amplitude of the laser. Further description of an RF generating quantum dot cell can be found in the co-pending application, entitled "Laser Drawn Electronics," having an internal reference No. 0086712-0545, which is incorporated herein by reference in its entirety.

The phase of laser 905 may need to be continuously reconfigured by a phase control module (not shown) because the distance between the skin of airship 105 and the exit point of laser 905 at laser module 205A ("strike distance") is constantly changing due to the movement of the skin. The phase control module is configured to continuously measure the strike distance, using an interferometer, and change the phase of laser 905 accordingly.

Laser generation module 205A is configured to direct laser 910 at the photoconductive layer of quantum dot cell 905. Upon exposure to the energy of the laser, one or more of the photoconductive layer 325 and charge transport layer 320 of quantum dot cell 905 become conductive and establish a path for electrical current to flow between conductive layers 305 and 310 via diode 335 and, thus, closes the circuit momentarily so that the current can accelerate and thus generate the RF. In one embodiment, one or more of layers 305 and 310, charge transport layer 320, and/or photoconductive layer 325 are configured to emit RF signals at the present of current flow.

Figure 10:
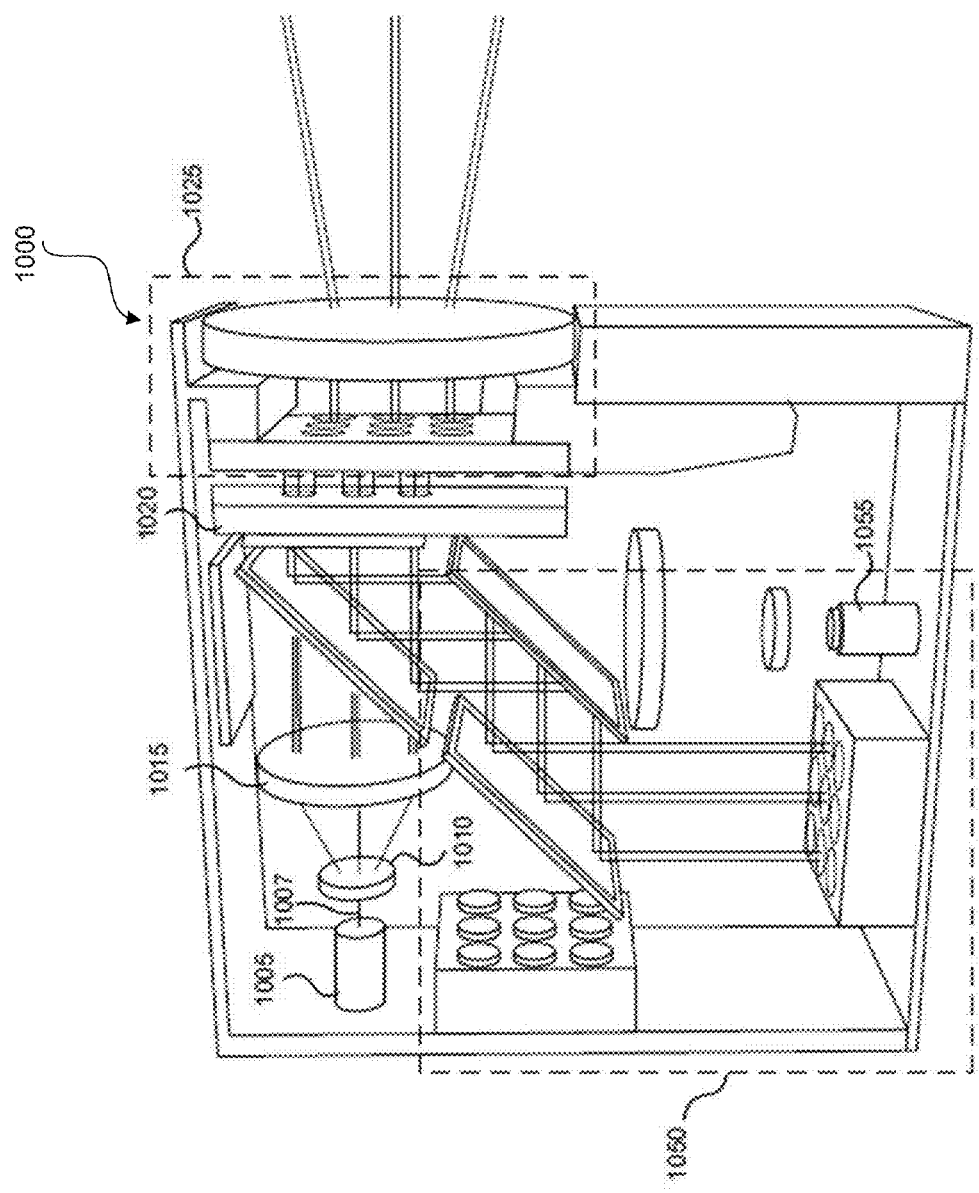
FIG. 10 illustrates an exemplary laser generation module according to one embodiment of the present invention.

FIG. 10 illustrates an exemplary laser generation module 1000 according to one embodiment of the present invention. Laser module 205A may include one or more features of laser generation module 1000 as described herein. Laser module 1000 includes a laser collimator 1005, a beam splitter 1010, and a second collimator 1015, an optical switch 1020, and an array of lens 1025. As shown in FIG. 10, collimator 1005 directs a collimated laser beam 1007 to beam splitter 1010 where laser beam 1007 is divided into a plurality of beams. Each of the beam is directed to collimator 1015, which directs the collimated beams to optical switch 1020.

Optical switch 1020 is configured direct the flow conditioned laser to a plurality of quantum dot cells (i.e., quantum dot cell 905) on the skin of airship 105 via lens array 1025. One or more lens of lens array 1025 are pre-configured expose a certain number of quantum dot cells. By directing the laser to a certain lens or lenses of lens array 1025, optical switch 1020 may control which quantum dot cells of the quantum dot array to laser exposure.

Figure 11:
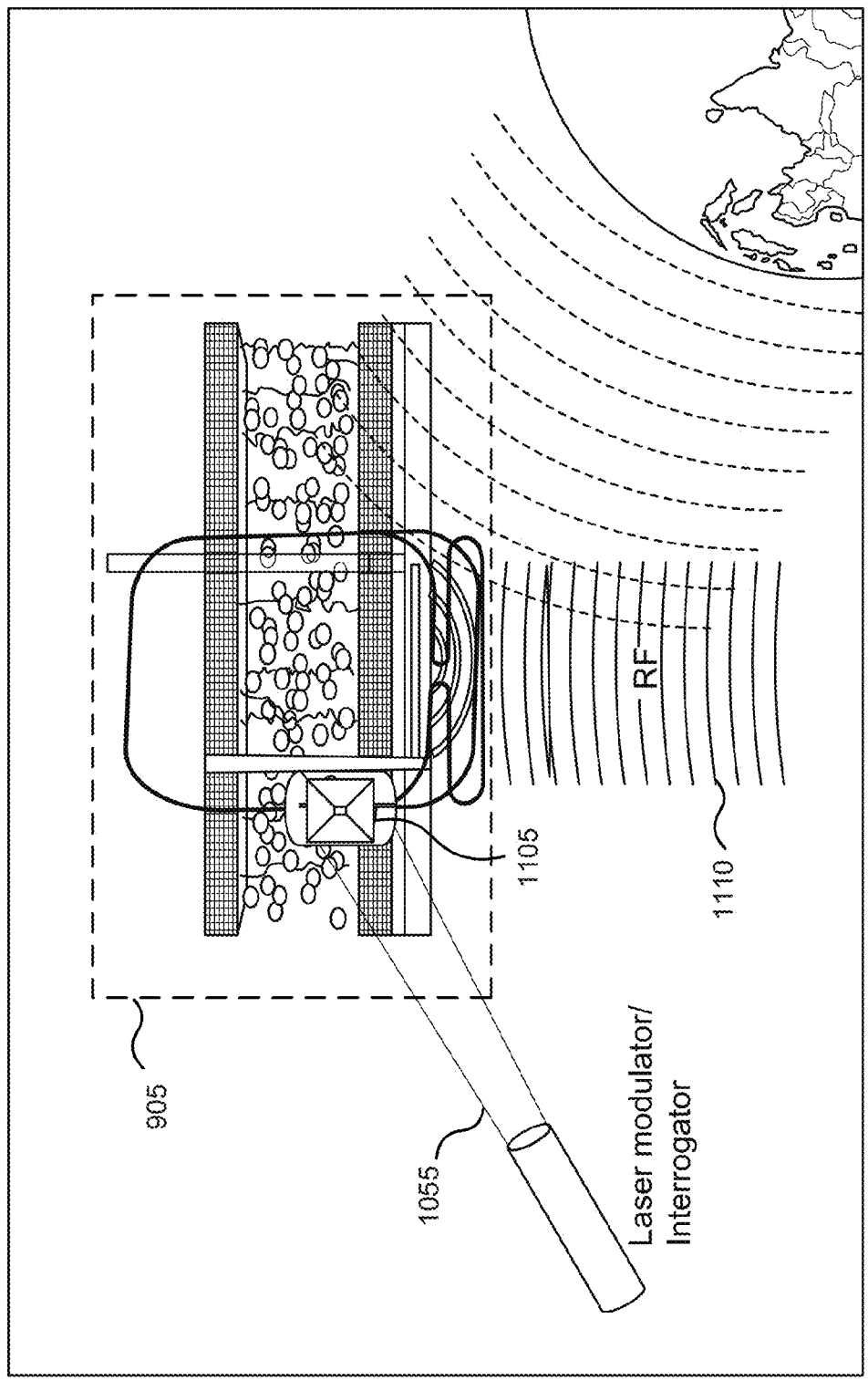
FIG. 11 illustrates an exemplary heterodyning system according to one embodiment of the present invention.

Laser module 1000 also include a difference detector 1050 for detecting the frequency of the return signals of the generated RF. Specifically, difference detector 1050 uses laser 1055 to detect the frequency of one or more crystal of transport layer 320. FIG. 11 illustrates an exemplary optical heterodyning method/system according one embodiment of the present invention. As shown in FIG. 11, a laser interrogator such as laser 1055 is used to measure the vibration frequency of one or more crystals 1105 that vibrate in response to the return RF signals 1110. Laser reflected by the vibrating crystals inherits the same frequency as the frequency of vibration. The reflected laser is then collected by lens array 1025 and is directed a difference detector. The difference between the reflected laser and the generated laser at collimator 1005 is then used as a feedback to alter the characteristic of the generated laser. This heterodyning process enables laser generation module 1000 to control the frequency and or amplitude of the outgoing laser in order to effect the frequency and amplitude of the generated. RF signals.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The invention claimed is:

1. A method for generating radio frequency (RF) signals, the method comprising:
    collecting and storing radiance energy, from a radiated body, using an array of quantum systems that comprises a layer of charge transport material sandwiched between first and second layers of conductive film; and
    striking a photoconductive layer adjacent to the first and second layers of conductive film of the array of quantum systems using a laser, from a laser generator, to establish current flow according to a diode associated with the photoconductive layer and the first and second layers of conductive film and to produce RF signals at a predetermined frequency.

2. The method of claim 1, wherein the layer of charge transport material comprises a layer of nanocrystaline composite.

3. The method of claim 2, wherein the layer of nanocrystaline composite comprises fractalized nanocrystals.

4. The method of claim 2, wherein layer of nanocrystaline composite comprises a tin composite material.

5. The method of claim 1, wherein the layer of charge transport material comprises a layer of polymer matrix.

6. The method of claim 1, further comprising positioning the array of quantum systems and the laser generator on an airship more than 10,000 feet above the radiated body.

7. The method of claim 1, wherein the second layer of conductive film is transparent o infrared wavelengths.

8. The method of claim 2, wherein the array of quantum systems is positioned on an outer surface of the airship and the laser generator is positioned in the interior of the airship.

9. The method of claim 2, wherein the array of quantum systems further comprises a diode coupled to the photoconductive layer and the first and second layers of conductive film.

10. The method of claim 1, further comprising:
    determining a distance between the array of quantum systems and a laser exit point of the laser generator; and
    adjusting the phase of the laser based on the determined distance.

11. An RF transmitter comprising:
    an array of quantum systems configured to collect and store radiance energy, from a radiated body, the array of quantum systems comprising a layer of charge transport material sandwiched between first and second layers of conductive film and a photoconductive layer adjacent to the first and second layers of conductive film of the array of quantum systems;
    a diode electrically coupled to the photoconductive layer and the first and second layers of conductive film and
    a laser module configured to strike the photoconductive layer to establish current flow according to the diode and to cause the array of quantum systems to emit an RF signal.

12. The RF transmitter of claim 11, wherein the layer of charge transport material comprises a layer of nanocrystaline composite.

13. The RF transmitter of claim 12, wherein the layer of nanocrystaline composite comprises fractalized nanocrystals.

14. The RF transmitter of claim 12, wherein layer of noncrystaline composite comprises a tin composite material.

15. The RF transmitter of claim 11, wherein the layer of charge transport material comprises a layer of polymer matrix.

16. The RF transmitter of claim 11, wherein the airship is positioned more than 10,000 feet above the radiated body.

17. The RF transmitter of claim 11, wherein the second layer of conductive film is transparent to infrared wavelengths.

18. The RF transmitter of claim 11, wherein the array of quantum systems is positioned on an outer surface of the airship and the laser module is positioned in the interior of the airship.

19. The RF transmitter of claim 11, further comprising a laser controller module configured to determine a distance between the array of quantum systems and a laser exit point of the laser generator, and to adjust the phase of the laser based on the determined distance.

20. The RF transmitter of claim 11, wherein the photoconductive layer is located at an outermost layer furthest away from the laser module.

21. The RF transmitter of claim 11, wherein photoconductive layer is located between the first and second layers of conductive film.

22. The RF transmitter of claim 11, wherein the array of quantum systems further comprises a diode coupled to the photoconductive layer and the first and second layers of conductive film.

* * * * *